United States Patent [19]
Hardison et al.

[11] Patent Number: 5,645,718
[45] Date of Patent: *Jul. 8, 1997

[54] REVERSIBLE FILTER ELEMENT

[75] Inventors: Steven D. Hardison; Walter H. Stone, both of Modesto, Calif.

[73] Assignee: Parker Hannifin Corporation, Cleveland, Ohio

[*] Notice: The term of this patent shall not extend beyond the expiration date of Pat. No. 5,362,389.

[21] Appl. No.: 296,568

[22] Filed: Aug. 26, 1994

Related U.S. Application Data

[60] Division of Ser. No. 888,688, May 22, 1992, Pat. No. 5,362,389, which is a continuation-in-part of Ser. No. 683,096, Apr. 10, 1991, Pat. No. 5,244,571, which is a continuation of Ser. No. 586,827, Sep. 24, 1990, abandoned, which is a division of Ser. No. 370,097, Jun. 20, 1989, Pat. No. 4,997,555, which is a continuation of Ser. No. 242,791, Sep. 9, 1988, abandoned, which is a continuation of Ser. No. 32,834, Mar. 30, 1987, abandoned, which is a continuation-in-part of Ser. No. 784,292, Oct. 7, 1985, Pat. No. 4,692,245, which is a continuation-in-part of Ser. No. 733,808, May 14, 1985, Pat. No. 4,668,393.

[51] Int. Cl.$^6$ ................................................. B01D 27/08
[52] U.S. Cl. ............................................... 210/232; 210/444
[58] Field of Search .................................. 210/232, 248, 210/416.4, 444

[56] References Cited

U.S. PATENT DOCUMENTS

| | | | |
|---|---|---|---|
| 2,582,388 | 1/1952 | Mansfield | 210/266 |
| 3,789,991 | 2/1974 | Krongos | 210/449 |
| 4,502,956 | 3/1985 | Wilson et al. | 210/248 |
| 4,559,138 | 12/1985 | Harms | 210/330 |
| 4,668,393 | 5/1987 | Stone | 210/304 |
| 4,692,245 | 9/1987 | Church et al. | 210/232 |
| 4,997,555 | 3/1991 | Church et al. | 210/136 |
| 5,244,571 | 9/1993 | Church et al. | 210/232 |
| 5,362,389 | 11/1994 | Hardison et al. | 210/232 |

*Primary Examiner*—Ivars Cintins
*Attorney, Agent, or Firm*—Renner, Otto, Boisselle & Sklar

[57] ABSTRACT

A fuel filter assembly (10) includes a filter head (12) having a fuel inlet (18) and a fuel outlet (20). A filter element (14) is attached to said filter head. A collection bowl (16) is attached to the filter element. The filter element includes an outer wall (36) with upper and lower turned in edge portions (62, 72). Upper and lower ring shaped members (64, 74) are in abutting contact with said turned in edge portions and are positioned intermediate of said edge portions and end caps (46, 48) of an annular filter medium (38). The end caps include central openings (54) surrounded by circular resilient gaskets (58). The filter element (14) is attachable by either of its ring shaped members to the filter head and collection bowl.

37 Claims, 4 Drawing Sheets

REVERSIBLE FILTER ELEMENT

CROSS REFERENCE TO RELATED APPLICATIONS

This application is a division of U.S. patent application Ser. No. 07/888,688 filed May 22, 1992, now U.S. Pat. No. 5,362,389; which is a continuation-in-part of application Ser. No. 07/683,096 filed Apr. 10, 1991 now U.S. Pat. No. 5,244,571; which is a continuation application of application Ser. No. 07/586,827 filed Sep. 24, 1990, now abandoned; which is a divisional of application Ser. No. 07/370,097 filed on Jun. 20, 1989 now U.S. Pat. No. 4,997,555; which is a continuation of application Ser. No. 07/242,791 filed on Sep. 9, 1988, now abandoned; which is a continuation of application Ser. No. 07/032,834 filed on Mar. 30, 1987, now abandoned; which is a continuation-in-part of application Ser. No. 06/784,292 filed on Oct. 7, 1985 now U.S. Pat. No. 4,692,245; which is a continuation-in-part of application Ser. No. 06/733,808 filed on May 14, 1985 now U.S. Pat. No. 4,668,393.

TECHNICAL FIELD

This invention relates to filters for filtering hydrocarbon fuels used in motor vehicles. Specifically this invention relates to a fuel filter assembly that includes a reversible element with ends that may be mounted either to a filter head or to a collection bowl.

BACKGROUND ART

Various types of fuel filter elements are known in the prior art. A particularly popular fuel filter element configuration is the "spin on" type element which may be readily attached and detached from a filter head. An example of a spin-on type element is shown in U.S. Pat. No. 4,997,555 which is owned by the assignee of the present invention.

A popular type of spin-on element includes a see-through collection bowl which is releasibly attached to the lower end of the element. The collection bowl collects contaminants which are separated from the fuel by the action of the element. The see-through character of the collection bowl enables an operator to know that the bowl is filled with contaminants. An example of the spin-on filter element with an attachable bowl is shown in U.S. Pat. No. 4,668,393 which is also owned by the assignee of the present invention.

All of the prior art spin-on type filter elements of which Applicants are aware include a threaded "top" or "cover" plate at the top of the filter element. This top plate is typically made from heavy gage metal material. The central threaded opening in the top plate threads on to a spud which extends downward from the filter element mounting head. This threaded top plate enables the filter element to be sufficiently tightened to secure it to the head, as well as to compress a gasket that extends about the periphery of the element to provide a seal between the head and the element. This relatively thick, machined top plate adds substantial cost to the filter element.

All prior art filter elements of which Applicants are aware utilize a type of construction at the lower end of the element to attach the collection bowl, that is different from the construction used to attach the element to the head. As a result, the filter element may be installed only one way, that is with the top plate adjacent the head and the lower end of the filter element which includes the attaching mechanism for the bowl, away from the filter head.

Thus there exists the need for a fuel filter assembly that includes an element that does not have a costly top plate and which is fully reversible in that either end of the element may be satisfactorily attached to the head or the collection bowl.

DISCLOSURE OF INVENTION

It is an object of the present invention to provide a fuel filter assembly that includes an element that is more economical to manufacture.

It is a further object of the present invention to provide a fuel filter assembly which includes an element that is fully reversible and has ends that may be attached either to a filter head or a collection bowl of the assembly.

It is a further object of the present invention to provide a fuel filter assembly with a filter mounting head that is lower in cost and easier to produce.

Further objects of the present invention will be made apparent in the following Best Mode for Carrying Out Invention and the appended claims.

Foregoing objects are accomplished in the preferred embodiment of the invention by a fuel filter assembly including a filter head, a filter element releasibly attachable at the top of said element to said filter head, and a collection bowl releasible attachable to the bottom of said element. The element includes a generally cylindrical housing with an outer wall that includes upper and lower turned in edge portions. A first ring shaped member is supported on the lower turned in edge portion and is held between said lower turned in edge portion and a lower end cap that is attached to an annular filter medium.

A second ring shaped member is positioned between the upper turned in edge portion and an upper end cap attached to said filter medium.

The first and second ring shaped members include inwardly directed threaded portions. The filter head and collection bowl each include outwardly directed threaded portions for engaging either of said ring members. The filter head includes an annularly extending shoulder that is positioned so that the upper turned in edge portion of the filter element is positioned between said second ring shaped member and the shoulder of said head when said element is attached to the head.

The collection bowl also includes an outwardly threaded portion for engaging the threaded portion of either the first or second ring shaped members. The collection bowl also includes an annularly extending shoulder that is positioned so that the lower turned in edge of said element is positioned between the shoulder of the collection bowl and the first ring member when the collection bowl is attached to the element.

Each of the end caps bounding the filter medium include central openings centered with respect to the housing. Each of the central openings is bounded by a resilient gasket mounted to the end cap. The filter head includes an inner annular wall which extends downward and engages the gasket on the upper end cap when the filter element is mounted to the head. The chamber bounded by the inner annular wall is connected to the outlet of the filter head.

In operation, fuel from the inlet of the filter head passes to an outer chamber bounded by the outside of the inner annular wall. The fuel from the inlet moves downwardly into a peripheral chamber between the outer wall of the filter element and the filter medium. The fuel is filtered by passing through the filter medium from the peripheral chamber to a central area inside the medium. The area is opened through the central opening in the upper end cap to the inner chamber of the filter head. Filtered fuel passes from the central area of the medium, through the central opening in the end cap, through the inner chamber and out the outlet of the filter head.

The collection bowl also includes an inner annular wall which extends upward and bounds a blind chamber within the bowl. The inner annular wall of the bowl has a diameter similar to the inner annular wall of the filter head and engages the gasket bounding the central opening on the lower end cap of the filter medium when the bowl is engaged to the element. The inner annular wall of the collection bowl blocks fuel flow from an outer chamber of the bowl in which contaminants are collected. As a result, the central area of the filter medium is in fluid communication only with the outlet of the filter head.

The first and second ring shaped members of the filter element are identical so that either end of the filter element may be attached to the filter head or collection bowl. Further, the construction of the fuel filter assembly is suitable for use with filter elements that include either "outside in" or "inside out" flow through the element.

BEST MODE FOR CARRYING OUT INVENTION

Figure 1:
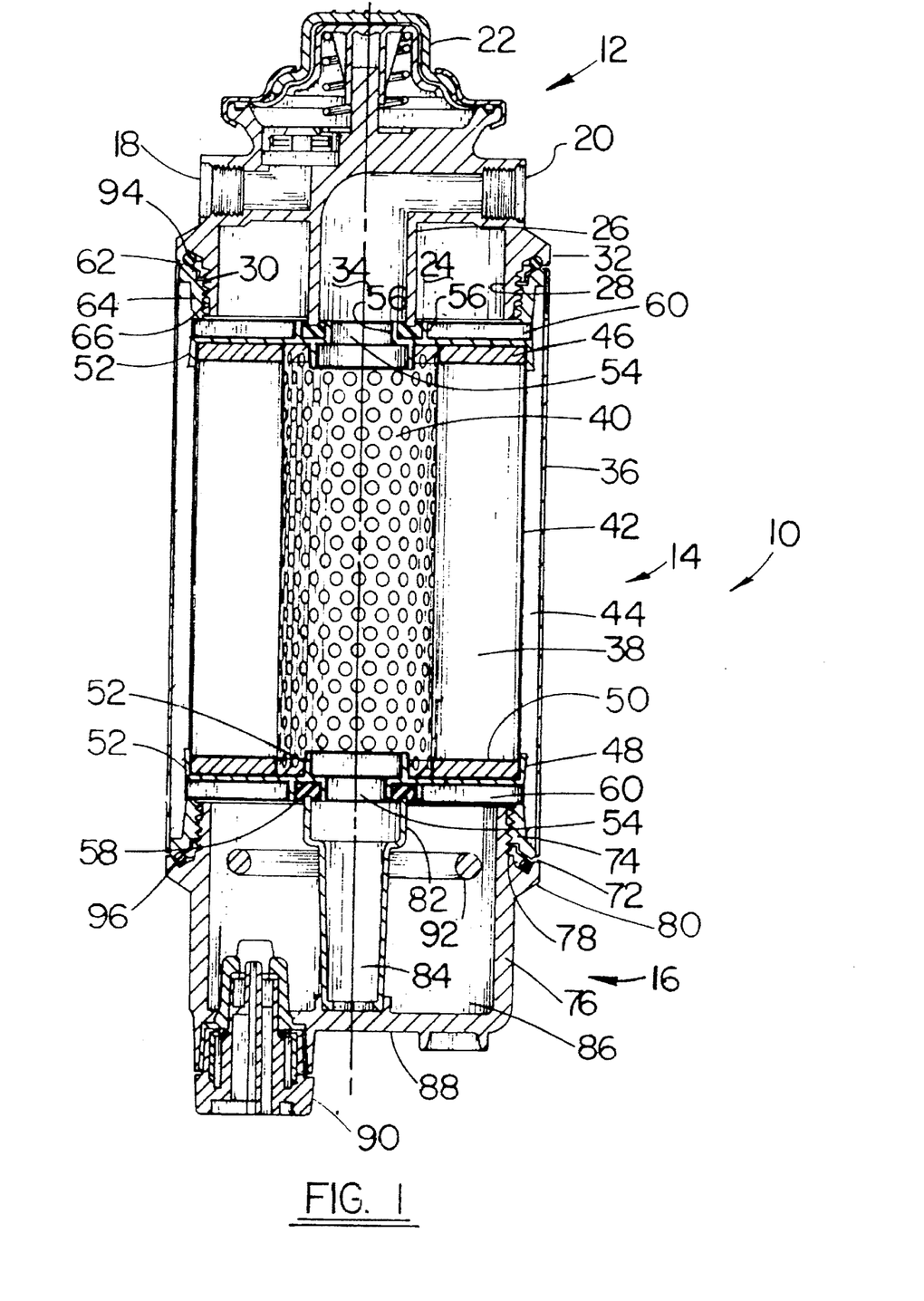
FIG. 1 is a cross sectional view of the fuel filter assembly of the present invention.

Referring now to the drawings and particularly to FIG. 1, there is shown therein the fuel filter assembly of the present invention, generally indicated 10. The fuel filter assembly includes a filter head, generally indicated 12, a filter element, generally indicated 14, and a contaminant collection bowl, generally indicated 16.

The filter head has an inlet 18 for accepting incoming fuel to be filtered, and an outlet 20 for delivering filtered to fuel to the remainder of the fuel system of the vehicle or other device on which the assembly is used.

The filter head incorporates a priming pump assembly, generally indicated 22 which is used for purposes of priming the filter head and element when the element is changed. The priming pump assembly 22 of the preferred embodiment is similar to that shown in U.S. patent application Ser. No. 07/849,264 which is owned by the assignee of the present invention and the disclosure of which is incorporated herein by reference.

Incoming fuel is delivered from the inlet 18 to an outer chamber 24 which is recessed upward in the filter head. Outer chamber 24 extends between a downward depending inner annular wall 26 and a downward extending outer annular wall 28. Outer annular wall 28 includes an outwardly threaded portion 30. A generally outward extending annular shoulder 32 extends radially from the filter head above outer annular wall 28.

An inner surface of inner annular wall 26 bounds an inner chamber 34 in the filter head. Inner chamber 34 is in fluid communication with outlet 20.

Filter element 14 includes a generally cylindrical housing which is bounded by an outer wall 36. Filter element 14 also houses an annular ring of filter medium 38. In the preferred form of the invention, the filter medium is of the pleated paper type, but in other embodiments other types of filter media may be used. Filter medium 38 extends radially outward from a central perforated tube 40. Perforated tube 40 bounds a central area of the filter medium. An outer surface 42 of filter medium 38 is inwardly disposed from an inner face of outer wall 36 of the filter housing. A peripheral chamber 44 is bounded by the outer surface of filter medium 42 and the inner face of wall 36.

Filter medium 38 is bounded in its upper end by an upper end cap 46, at its lower end by a lower end cap 48 which in the preferred embodiment are identical. The filter medium is held to the end caps by potting compound 50 in the conventional manner.

Each of the end caps have a generally circular central plate portion 51. Inwardly directed ribs 52 serve to hold the filter medium and perforated tube 40 in position. Ribs 52 are angled slightly in the axial direction to provide a funnel effect for ease of attachment to the filter medium. The end caps also include central openings 54 (see FIGS. 5–7). Central opening 54 in the upper end cap is a first flow passage and serves as first flow passage means between the central area of the filter medium and the inner chamber 34 of the filter head.

Figure 5:
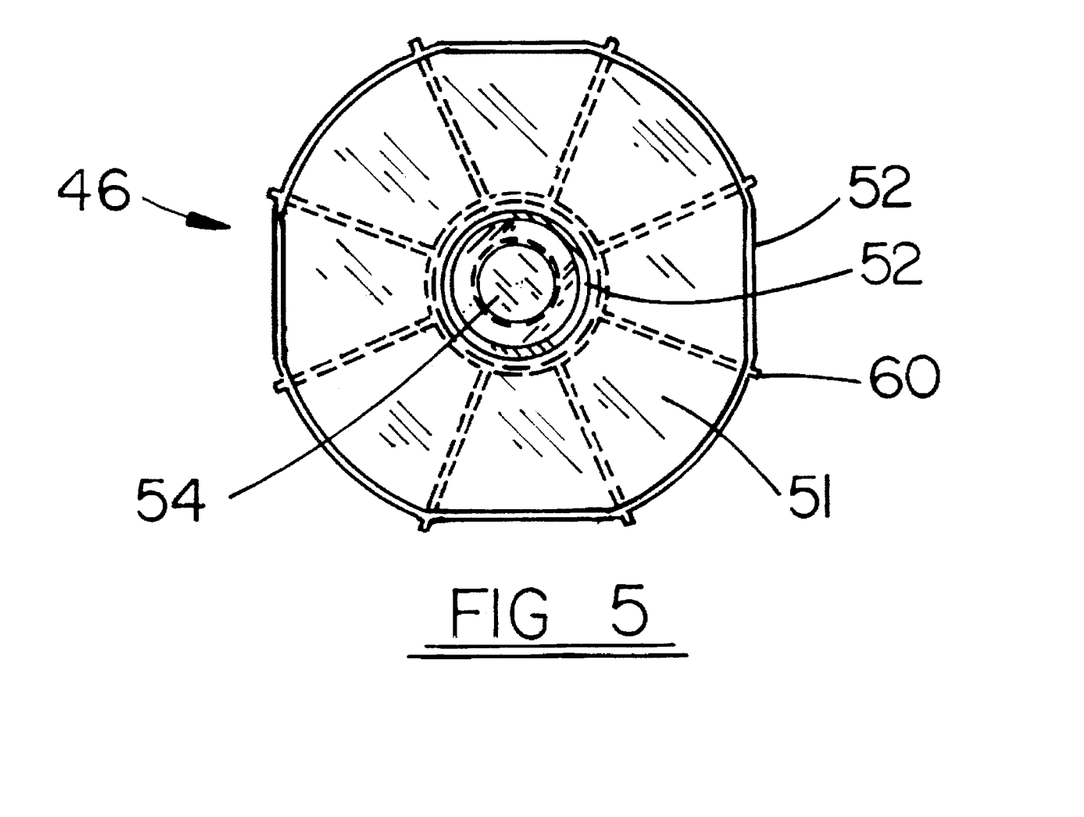
FIG. 5 is a top plan view of an end cap of the filter element.
Figure 6:
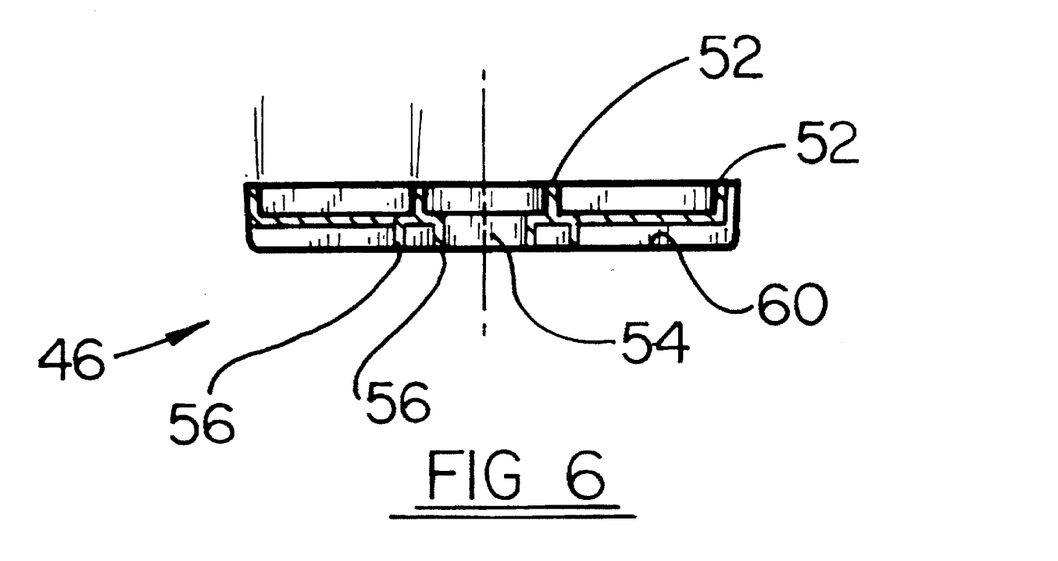
FIG. 6 is a cross sectional view of the end cap shown in FIG. 5.
Figure 7:
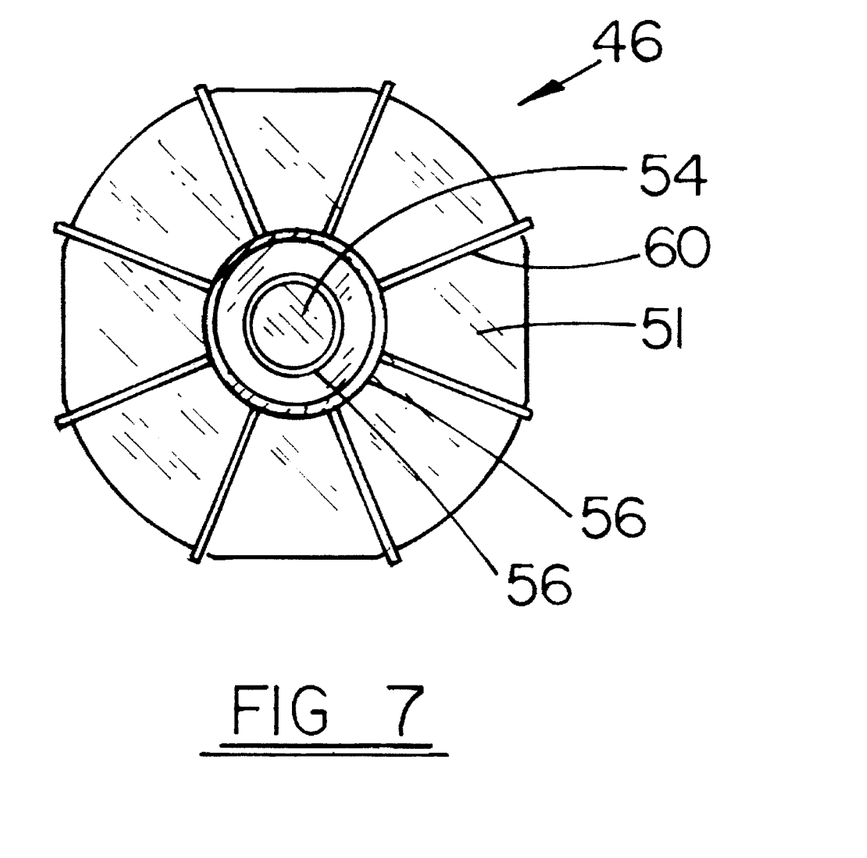
FIG. 7 is a bottom view of the end cap shown in FIG. 5.

Central opening 54 in each end cap is bounded by a pair of spaced outwardly directed ribs 56. Outwardly directed ribs 56 bound a channel in which a resilient circular gasket 58 is positioned when the element is installed in the assembly. The end caps further include a plurality of radially extending ribs 60 that extend outwardly from the end cap and have similar height to ribs 56. Radially extending ribs 60 extend somewhat beyond the central plate portion 51 of the end cap as shown in FIGS. 5 and 7.

The outer wall 36 of filter element 14 includes an upper turned in edge portion 62. Turned in edge portion 62 extends circumferentially about the filter element. An upper ring shaped member 64 is positioned internally of said element and in abutting relation with the turned in edge portion. Upper ring shaped member 64 is also in abutting contact with the radially extending ribs 60 of upper end cap 46. Upper ring shaped member 64 has a threaded portion 66 which engages the threaded portion 30 of the filter head when the element is attached thereto.

Figure 2:
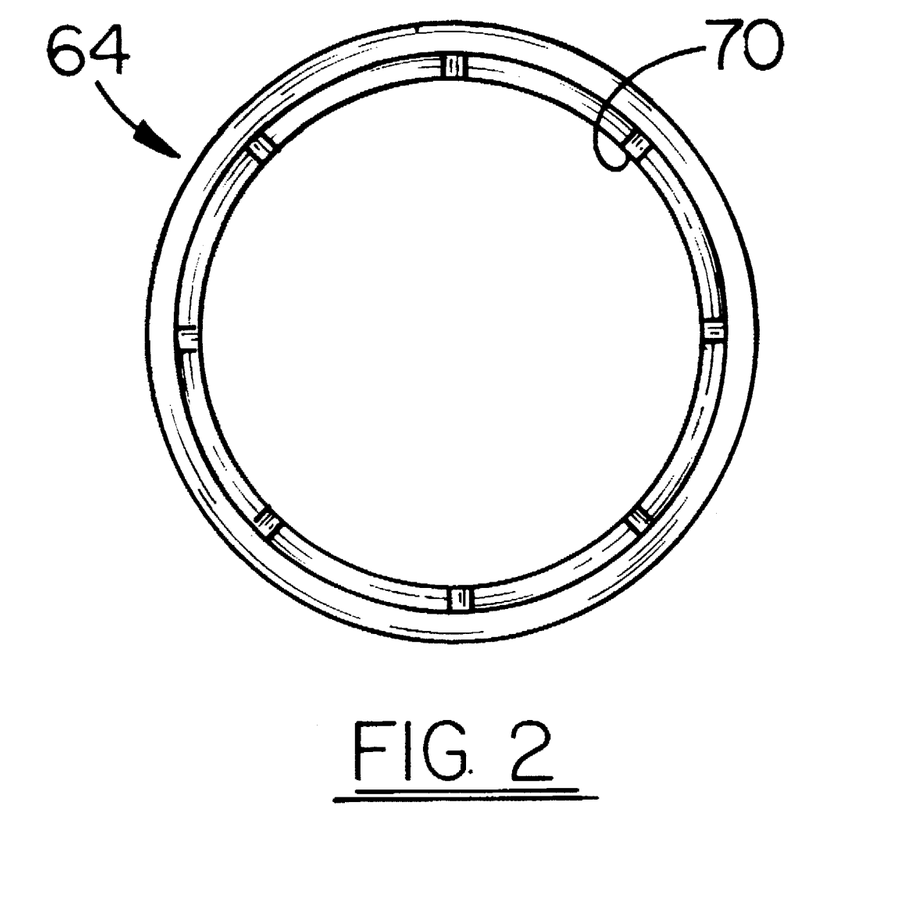
FIG. 2 is a plan view of a ring shaped member of the filter element.
Figure 3:
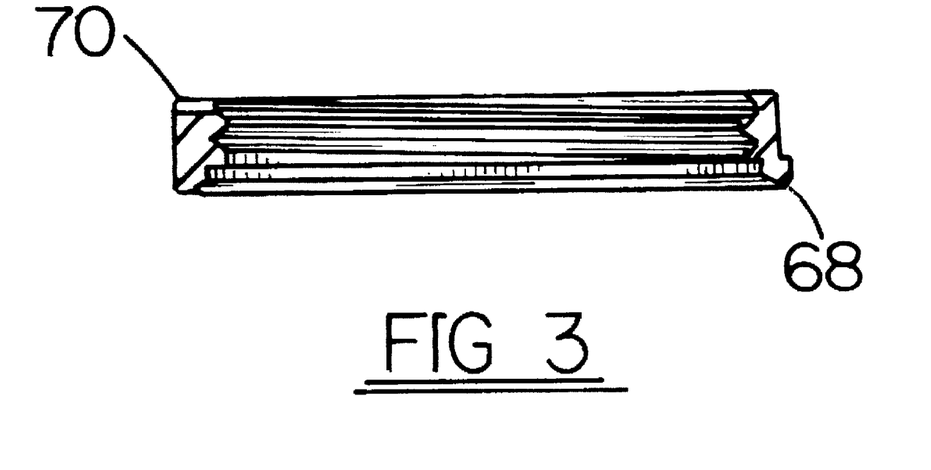
FIG. 3 is a cross sectional view of the ring shape member along line A—A in FIG. 2.
Figure 4:
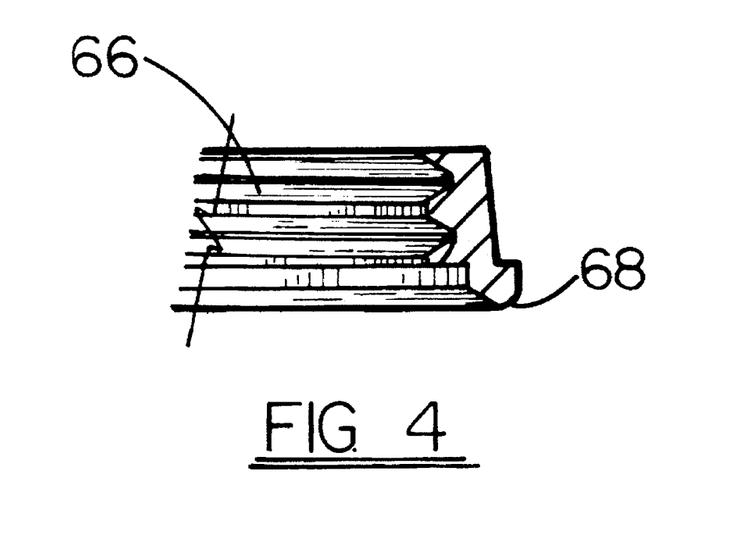
FIG. 4 is an enlarged cross sectional view of the section of the ring shaped member shown in FIG. 3.

Ring shaped member 64 shown in greater detail in FIGS. 2–4. Ring shaped member 64 includes a head portion 68 which is captured by upper in turned edge portion 62 of wall 36 of the filter element housing. Ring shaped member 64 also includes a plurality of slots 70 which are sized to accept radially extending ribs 60 of upper end cap 46. When ring shaped member 64 is in engagement with the radially extending ribs 60, second flow passages which serve as second flow passage means extend through spaces intermediate of the ribs between the peripheral chamber 44 and the outer chamber 24 of the filter head.

Wall 36 of the filter element housing also includes a lower turned in edge portion 72 which in similar in configuration to upper turned in edge portion 62. Lower turned in edge portion 72 supports a lower ring shaped member 74 which is identical to upper ring shaped member 64, except that it is oppositely directed. Lower ring shaped member 74 supports the radially extending ribs 60 on lower end cap 48 of the filter medium.

Collection bowl 16 includes an outer annular wall 76. Outer annular wall 76 includes a threaded portion 78 that engages the threads on lower ring shaped member 74. Outer annular wall 76 further includes a radially extending shoulder 80. Shoulder 80 is positioned so that when collection bowl 16 is attached to filter element 14, lower turned in edge portion 72 is positioned between lower ring shaped member 74 and shoulder 80.

Collection bowl 16 further includes an upwardly directed inner annular wall 82. Inner annular wall 82 bounds a blind chamber 84. The upper portions of inner annular wall 82 are sized to engage gasket 58 on lower end cap 48 when the collection bowl is attached to the filter element. The engagement of inner annular wall 82 and the gasket on the end cap provides a fluid tight seal.

A contaminant collection chamber 86 is bounded by inner annular wall 82 and outer annular wall 76. As later explained, contaminants and water which are captured by the filter assembly, fall into the contaminant collection chamber 86. The contaminants and water pass from the peripheral chamber 44 to the contaminant collection chamber 86 through third flow passages which extend through spaces between the radially extending ribs of the lower end cap 48 which passages serve as third flow passage means. A lower wall 88 of the bowl 16 includes a conventional self venting drain valve 90 extending therethrough. Drain valve 90 enables the draining of water and other contaminants that collect in the bowl. The fuel filter assembly may also optionally include a fuel heater which is schematically represented by coil 92 positioned inside bowl 16.

The fuel filter assembly also includes an upper circular resilient gasket 94 which is positioned in a recess (not separately shown) in the head. Upper gasket 94 provides a fluid tight seal between the head 12 and the element 14. Likewise, a lower gasket 96 is positioned in a recess (not separately shown) in the shoulder 80 of the collection bowl. Lower gasket 96 provides a fluid tight seal between the collection bowl and the filter element.

In operation, fuel enters the inlet 18 of the filter head, and when the priming pump assembly 22 is not in use, flows directly into outer chamber 24. From outer chamber 24, fuel flows downwardly between the radially extending ribs of upper end cap 46 and into the peripheral chamber 44 between the wall of the filter housing and the outer surface 42 of the filter medium 38.

From the peripheral chamber 44, the fuel flows radially inward through the filter medium, passes through the perforated tube 40 and enters the central area inside the perforated tube. Because the opening 54 in lower end cap 48, is in sealed relation with blind chamber 84, no fuel can flow downwardly from the central area. Therefore, fuel in the central area flows upward into inner chamber 34 of the filter head, and out the outlet 20.

Contaminants such as water and other contaminants flowing into the peripheral chamber 44 collect on the filter medium and fall vertically downward. These contaminants fall to the level of fluid passageways that extend between radially extending ribs 60 of lower end cap 48. The contaminants then flow downward into the contaminant collection chamber 86 of collection bowl 16. In the preferred embodiment, collection bowl 16 is made of transparent material so that an operator can determine that contaminants have collected therein and may periodically open drain valve 90 to discharge said contaminants.

Because the construction of the upper and lower end caps and ring shaped members of the filler element are identical, either end of the filter element may be attached to the head or the collection bowl. As a result, a mechanic need not be concerned with which way the filter is installed. In addition, this construction avoids the need for a heavy metal top plate, as satisfactory engagement of head and filter element is achieved by the threaded portions of the head and upper ring shaped member 30 and 66, respectively. The gaskets 58 on the upper and lower end caps, provide superior sealing against inner annular wall 26 of the filter head, as well as against inner annular wall 82 of the collection bowl. As a result, there is no cross flow contamination through the fuel filter assembly.

Thus, the fuel filter assembly of the present invention achieves the above stated objectives, eliminate difficulties encountered in the use of prior devices and systems, solves problems and attains the desirable results described herein.

In the foregoing description, certain terms have been used for brevity, clarity and understanding, however, no unnecessary limitations are to be implied therefrom because such terms are for descriptive purposes and are intended to be broadly construed. Moreover, the descriptions and illustrations herein are by way of examples and the invention is not limited to the exact details shown or described. Further, in the appended claims any feature or element claimed as a means for performing a function shall be construed as encompassing any means capable of performing the function and shall not be construed as limited to the particular means shown or described in the foregoing description.

Having described the features, discoveries and principles of the invention, the manner in which it is constructed and operated and the advantages and useful results obtained; the new and useful structures, devices, elements, arrangements, parts, combinations, systems, equipment, operations and relationships are set forth in the appended claims.

We claim:

1. A fuel filter element comprising:

a housing;

an annular filter medium separating a central fuel chamber from a peripheral fuel chamber within said housing;

a first ring shaped member;

a second ring shaped member;

said housing having a lower turned in edge portion in supporting relation with said first ring shaped member and said filter medium;

said housing further having an upper turned in edge portion, said second ring shaped member positioned intermediate of said upper turned in edge portion and said filter medium;

said first ring shaped member having a first annular threaded portion whereby a collection bowl may be removably attached to said filter element, and wherein said filter element further includes a third flow passage not extending through said filter medium enabling contaminants to pass from said peripheral chamber downwardly and interiorly of said first threaded portion of said first ring shaped member, whereby contaminants may be collected within said collection bowl when attached; and said second ring shaped member having a second annularly threaded portion whereby said element may be removably attached to a filter head, said element further including a second flow passage not extending through said filter medium enabling fuel to pass downwardly and interiorly of said second annularly threaded portion of said second ring shaped member to said peripheral chamber, and a first flow passage enabling fuel to flow upwardly from said central fuel chamber, whereby fuel is enabled to pass from said element to said head when attached.

2. The fuel filter element according to claim 1 wherein said first and second annularly threaded portions of said first and second ring shaped members respectively are threadably interchangeable, whereby said element may be attached to said head and said collection bowl by either of said ring shaped members.

3. A filter element comprising:

a cylindrical housing, said housing including a turned in edge portion extending circumferentially at a first longitudinal end of said housing;

an annular filter medium in said housing, said filter medium separating a central fuel chamber from a peripheral fuel chamber in said housing;

a ring shaded member, said ring shaped member in adjacent relation with said turned in edge portion interiorly of said housing, said ring shaped member extending intermediate of said filter medium and said turned in edge portion:

said ring shaded member having an annularly threaded portion, whereby said element may be releasibly attached to a filter head or a collection bowl, said element further including a flow passageway not extending through said filter medium enabling fluid to pass between said peripheral chamber and said bowl or head, when attached, interiorly of said annular threaded portion; and further comprising:

a further turned in edge portion at an opposed longitudinal end of said housing;

a further ring shaped member in adjacent relation with said further turned in edge portion interiorly of said housing, said further ring shaped member extending intermediate of said further turned in edge portion and said filter medium, said further ring shaped member having a further annularly threaded portion threadably interchangeable with said other ring shaped member.

4. A filter element comprising:

a generally cylindrical housing, said housing having a first longitudinal end and a second longitudinal end;

an annular filter media ring in said housing, said media ring dividing a central area bounded by said media ring from a peripheral chamber;

a first threaded ring attached to said housing at said first longitudinal end and bounding a first end opening, and at least one first flow passage extending between said first end opening and said peripheral chamber externally of said media ring, and a second threaded ring attached to said housing at said second longitudinal end and bounding a second end opening, and at least one second flow passage extending between said second end opening and said peripheral chamber externally of said media ring.

5. A filter element comprising:

a generally cylindrical housing;

an annular filter media ring in said housing, said media ring dividing a central area bounded by said media ring from a peripheral chamber;

a first end cap in fluid tight relation with said media ring at a first longitudinal end, said first end cap including a first central opening through said first end cap to said central area;

a second end cap in fluid tight relation with said media ring at an opposed longitudinal end, said second end cap including a second central opening through said second end cap to said central area;

a first threaded ring attached to said housing at said first longitudinal end and bounding a first end opening, and at least one second flow passage extending between said first end opening and said peripheral fuel chamber externally of said media ring;

a second threaded ring attached to said housing at said opposed longitudinal end and bounding a second end opening, and at least one third flow passage extending between said second end opening and said peripheral fuel chamber externally of said media ring.

6. The filter element according to claim 5 wherein said first and second threaded rings are threadably interchangeable.

7. The filter element according to claim 6 wherein said element further comprises a first ring shaped member adjacent said first longitudinal end and in fluid tight relation with said housing, said first ring shaped member including said first threaded ring.

8. The filter element according to claim 7 wherein said element further comprises a second ring shaped member adjacent said second longitudinal end and in fluid tight relation with said housing, said second ring shaped member including said second threaded ring.

9. The filter element according to claim 8 wherein said first end cap includes a plurality of angularly spaced longitudinally extending first ribs in supported relation with said first ring shaped member, wherein said first ribs have first spaces thereinbetween and wherein said second flow passages include said first spaces; and wherein said second end cap includes a plurality of angularly spaced longitudinally extending second ribs in supported relation with said second ring shaped member wherein said second ribs have second spaces thereinbetween and said third flow passages include said second spaces.

10. The filter element according to claim 9 wherein said first end cap has a first resilient gasket circumferentially bounding said first central opening externally of said central area, said first gasket disposed radially inward of said first ribs; and wherein said second end cap has a resilient gasket supported thereon circumferentially bounding said second central opening externally of said central area, said second gasket disposed radially inward of said second ribs.

11. The filter element according to claim 10 wherein said first end cap includes a first annular longitudinally extending rib circumferentially bounding said first gasket and positioned radially outwardly thereof, and wherein said first ribs extend radially outward of said first annular rib, and wherein said second end cap includes a second annular longitudinally extending rib circumferentially bounding said second gasket and positioned radially outward thereof, and wherein said second ribs extend radially outward of said second annular rib.

12. The filter element according to claim 11 wherein said first end cap includes a third longitudinally extending annular rib bounding said first gasket radially interiorly, and wherein said second end cap includes a fourth longitudinally extending annular rib bounding said second gasket radially interiorly.

13. The filter element according to claim 6 and further comprising a threaded bowl engageable with either said first or said second threaded ring and wherein said respective end opening through said engaged threaded ring is in fluid tight relation with said bowl.

14. The filter element and bowl according to claim 13 wherein said bowl includes a blind chamber fluidly engaged with said central opening in the respective end cap adjacent said bowl.

15. The filter element and bowl according to claim 14 wherein said blind chamber is bounded by an inner annular wall positioned interiorly of said bowl and wherein said inner annular wall engages said adjacent end cap circumferentially and in fluid tight relation with the respective central opening therein.

16. The filter element and bowl according to claim 13 and further comprising a filter head engaged to said threaded ring at said longitudinal end opposed of said end in engagement with said bowl.

17. The filter element, bowl and filter head according to claim 16 wherein said filter head closes said end opening at said end of said element engaged to said head.

18. The filter element, bowl and filter head according to claim 17 wherein said head includes a first fluid port and a second fluid port, and an inner annular head wall and wherein said inner annular head wall engages said central opening in said adjacent end cap circumferentially in fluid tight relation and wherein said inner annular head wall bounds an inner chamber, wherein said first port is fluidly connected through said head with said inner chamber.

19. The filter element, bowl and filter head according to claim 18 wherein said filter head further comprises an outer chamber radially disposed between said inner annular wall and said adjacent threaded ring of said element and wherein said second port is fluidly connected through said head with said outer chamber.

20. The filter element bowl and filter head according to claim 17, wherein said element further comprises a further annular inturned portion adjacent said longitudinal end engaged with said head, said further inturned portion positioned radially outward of said adjacent threaded ring, and wherein said head comprises an annular head shoulder engaged with said further inturned portion.

21. The filter element, bowl and filter head according to claim 20 wherein said housing further comprises an annular inturned portion adjacent said longitudinal end engaged to said bowl, said inturned portion positioned radially outward of said adjacent threaded ring, and wherein said bowl comprises an annular bowl shoulder engaged with said inturned portion.

22. The filter element and bowl according to claim 13 wherein said housing further comprises an annular inturned portion adjacent said longitudinal end engaged to said bowl, said inturned portion positioned radially outward of said adjacent threaded ring, and wherein said bowl comprises an annular bowl shoulder engaged with said inturned portion.

23. The filter element according to claim 5 wherein said housing includes a first radially inturned portion in fluid tight relation with said first threaded ring and a second inturned portion in fluid tight relation with said second threaded ring.

24. The filter element according to claim 5 wherein said element further comprises a plurality of angularly spaced longitudinally extending first ribs adjacent and interiorly disposed of said first threaded ring, wherein said first ribs have first spaces thereinbetween, said second flow passages including said first spaces.

25. The filter element according to claim 24 wherein said first central opening is circumferentially bounded by a first resilient gasket, said first gasket positioned radially inward of said first ribs.

26. The filter element according to claim 24 wherein said element further comprises a plurality of angularly spaced longitudinally extending second ribs adjacent and interiorly disposed of said second threaded ring, wherein said second ribs have second spaces thereinbetween, said third flow passages including said second spaces.

27. The filter element according to claim 24 wherein said first central opening is bounded circumferentially by a first resilient gasket radially inwardly disposed of said first ribs.

28. The filter element according to claim 27 wherein said first end cap includes at least one outward directed longitudinally extending annular rib circumferentally bounding said first gasket.

29. The filter element according to claim 28 wherein said first annular rib is disposed radially outward of said first gasket and wherein said first ribs extend radially outward from said first annular rib.

30. The filter element according to claim 29 wherein said first ribs extend longitudinally outward from said first end cap.

31. The filter element according to claim 29 wherein said first end cap further comprises a second annular rib adjacent and positioned radially interiorly of said first gasket.

32. The filter element according to claim 5 wherein said first and second central openings are circumferentially bounded by first and second resilient gaskets respectively, said first and second gaskets accessible through said first and second end openings respectively.

33. A replaceable, reversible filter element for use in a filter assembly, said filter assembly including:

a filter head having a first fluid port and a second fluid port, and a head outer annular wall and a head inner annular wall, said head outer annular wall including a head threaded portion, said head inner annular wall dividing an inner head chamber from an outer head chamber within said head, said inner head chamber fluidly connected to said first port in said head, and said outer head chamber fluidly connected to said second port in said head;

and a collection bowl having a bowl outer annular wall and a bowl inner annular wall, said bowl outer annular wall including a bowl threaded portion, said bowl inner annular wall surrounding a blind chamber, and said bowl outer annular wall and said inner annular wall bounding a contaminant collection chamber therebetween, wherein said contaminant collection chamber is fluidly separated from said blind chamber in said bowl;

said filter element comprising:

a housing;

an annular filter media ring located in said housing dividing a central area interior to said media ring from a peripheral area located between said housing and said media ring;

a pair of resilient annular gaskets, each said gaskets disposed at a longitudinal end of said central area of said media ring, each of said gaskets extending longitudinally outwardly and including an opening therethrough to said central area, said element further including a flow passage at each longitudinal end between an area disposed radially outward from said adjacent gasket and said peripheral fuel chamber, each said flow passage not extending through said media ring, whereby when said filter element is connected to said filter head or said collection bowl, said gasket adjacent said connected end may be engaged by said head inner annular wall of said filter head or said bowl inner annular wall of said collection bowl such that said central area may be fluidly separated from said adjacent flow passage within said head or bowl.

34. The filter element according to claim 33 and further comprising:

two annular end caps, each said end cap connected to a longitudinal end of said media ring, each said end cap having a cap opening extending through said end cap aligned with said opening through said adjacent gasket, each said end cap having a plurality of longitudinally extending ribs extending radially outward of said adjacent gasket to the peripheral fuel chamber, said ribs having spaces in between, wherein said adjacent flow passage at said element ends include said spaces.

35. The filter element according to claim 34 wherein said housing includes two annular inturned portions at longitudinally opposed ends of said housing, each said inturned portion longitudinally disposed of said adjacent longitudinal end of said media ring, said element further comprising two ring shaped members, each said ring shaped member supported on one of said inturned portions.

36. The filter element according to claim 35 wherein each said ring shaped member includes a plurality of radially extending slots and wherein said radially extending ribs on said adjacent end cap are positioned in said slots.

37. The filter element according to claim 35 wherein each of said ring shaped members includes a threadably interchangeable portion, wherein either longitudinal end of said filter element may be connected to the filter head or the bowl by the threaded portion of either ring shaped member.

* * * * *